(12) United States Patent
Hildwein et al.

(10) Patent No.: US 9,802,162 B2
(45) Date of Patent: Oct. 31, 2017

(54) LEAK TESTING OF A PRESSURE VESSEL

(75) Inventors: Helmut Hildwein, Vöhringen (DE); Peter Wiegers, Stuttgart (DE); Franz Brohm, Hechingen (DE)

(73) Assignee: Gambro Lundia AB, Lund (SE)

( * ) Notice: Subject to any disclaimer, the term of this patent is extended or adjusted under 35 U.S.C. 154(b) by 126 days.

(21) Appl. No.: 13/125,534

(22) PCT Filed: Oct. 23, 2009

(86) PCT No.: PCT/EP2009/007604
§ 371 (c)(1),
(2), (4) Date: Apr. 21, 2011

(87) PCT Pub. No.: WO2010/051912
PCT Pub. Date: May 14, 2010

(65) Prior Publication Data
US 2011/0233216 A1    Sep. 29, 2011

(30) Foreign Application Priority Data
Oct. 30, 2008 (EP) .................................. 08018977

(51) Int. Cl.
*B01D 65/00*    (2006.01)
*B01D 65/10*    (2006.01)
(Continued)

(52) U.S. Cl.
CPC ........... *B01D 65/104* (2013.01); *B01D 63/00* (2013.01); *B01D 65/00* (2013.01);
(Continued)

(58) Field of Classification Search
CPC ...... B01D 65/104; B01D 65/00; B01D 63/00; B29C 66/12469; B29C 66/12461;
(Continued)

(56) References Cited

U.S. PATENT DOCUMENTS 4,210,251 A * 7/1980 Grussen .................. 215/329
4,283,284 A * 8/1981 Schnell .................. 210/321.8
(Continued)

FOREIGN PATENT DOCUMENTS

DE    1722672    3/1956
DE    3823870    6/1997
(Continued)

OTHER PUBLICATIONS

PCT International Search Report and Written Opinion for PCT/EP2009/007604, dated Apr. 19, 2010.

*Primary Examiner* — Anthony Stashick
*Assistant Examiner* — Ernesto Grano
(74) *Attorney, Agent, or Firm* — Barnes & Thornburg LLP

(57) ABSTRACT

An end cap for a pressure vessel has at least one part for connecting the end cap to a housing. The at least one part comprises a number of recesses. The recesses are arranged to form at least one fluid passage between an inside and an outside of the end cap when the end cap is plugged on the housing. A housing for a pressure vessel has at least one counterpart for connecting an end cap to the housing by engaging a part of the end cap. The at least one counterpart comprises a number of recesses. The recesses are arranged to form at least one fluid passage between an inside and an outside of the housing when the end cap is plugged on the housing. A method for leak testing a pressure vessel and a method for checking a connection between at least one end cap and a housing of a pressure vessel for leak tightness are also described.

3 Claims, 5 Drawing Sheets

(51) Int. Cl.
*B01D 63/00* (2006.01)
*B29C 65/82* (2006.01)
*G01M 3/04* (2006.01)
*B29C 65/00* (2006.01)
*B29C 65/02* (2006.01)
*B29L 31/14* (2006.01)
*B29L 31/00* (2006.01)

(52) U.S. Cl.
CPC .... *B29C 65/8246* (2013.01); *B29C 66/12449* (2013.01); *B29C 66/12461* (2013.01); *B29C 66/12469* (2013.01); *B29C 66/5344* (2013.01); *G01M 3/04* (2013.01); *B01D 2201/4046* (2013.01); *B01D 2313/04* (2013.01); *B01D 2313/20* (2013.01); *B01D 2313/21* (2013.01); *B01D 2313/44* (2013.01); *B29C 65/02* (2013.01); *B29C 66/71* (2013.01); *B29L 2031/14* (2013.01); *B29L 2031/7156* (2013.01)

(58) Field of Classification Search
CPC .......... B29C 66/12449; B29C 66/5344; B29C 65/8246; G01M 3/04
USPC ............ 220/581; 210/321.78, 321.79, 321.8, 210/321.81, 321.87, 321.88, 321.89, 210/321.9, 500.23; 96/8, 10
See application file for complete search history.

(56) References Cited

U.S. PATENT DOCUMENTS

| | | | |
|---|---|---|---|
| 4,415,095 A * | 11/1983 | Schweigert et al. .......... 215/329 |
| 4,469,338 A | 9/1984 | Legris |
| 4,513,605 A | 4/1985 | Hawerkamp |
| 4,739,893 A * | 4/1988 | Zumbuhl ...................... 215/344 |
| 4,817,815 A | 4/1989 | Stahlecker |
| 4,996,027 A * | 2/1991 | Kanner ................. A61L 12/128 |
| | | | 206/5.1 |
| 5,102,533 A | 4/1992 | Oshiyama |
| 5,256,284 A | 10/1993 | Lee |
| 5,263,362 A | 11/1993 | Karl et al. |
| 5,263,606 A | 11/1993 | Dutt et al. |
| 5,275,287 A * | 1/1994 | Thompson ..................... 215/344 |
| 5,630,522 A * | 5/1997 | Montgomery ................. 215/344 |
| 5,785,196 A * | 7/1998 | Montgomery ................. 215/354 |
| 5,954,215 A * | 9/1999 | Alter ............................. 215/318 |
| 6,702,134 B2 * | 3/2004 | Scalese et al. ................ 215/344 |
| 6,830,685 B2 | 12/2004 | Pope et al. |
| 7,014,765 B2 * | 3/2006 | Dannenmaier ............ 210/321.8 |
| 2003/0102264 A1 | 6/2003 | Pope et al. |

FOREIGN PATENT DOCUMENTS

| | | |
|---|---|---|
| EP | 0297410 | 3/1993 |
| EP | 1344630 | 9/2003 |
| EP | 1323462 | 3/2011 |
| WO | WO9212787 | 8/1992 |
| WO | WO0160502 | 8/2001 |

\* cited by examiner (state of the art)

… (1 / 2)

LEAK TESTING OF A PRESSURE VESSEL

CROSS-REFERENCE TO RELATED APPLICATIONS

This application is the U.S. national phase of PCT/EP2009/007604 filed Oct. 23, 2009. PCT/EP2009/007604 claims priority to European patent application 08018977.2 filed Oct. 30, 2008. The disclosures of both European patent application 08018977.2 and PCT/EP2009/007604 are hereby incorporated herein by reference.

TECHNICAL FIELD

The present disclosure relates to an end cap for a pressure vessel, in particular to an end cap for a diffusion and/or filtration device, such as a dialyser, hemofilter, or ultrafilter. The disclosure also relates to a housing for the pressure vessel, and to a method for leak testing such a pressure vessel, in particular such a diffusion and/or filtration device.

DESCRIPTION OF THE RELATED ART

Pressure vessels, such as diffusion and/or filtration devices, are used in various treatments of blood, for example as dialysers, hemofilters, or ultrafilters. The devices are integrated in a circulation system, wherein blood is taken from a patient and is guided through the devices for treatment, such as filtering and cleaning the blood. Subsequently, the treated blood is returned to the patient.

The devices generally encompass a housing acting as a pressure vessel comprising a tubular section with end caps capping openings at the ends of the tubular section. Inside the housing usually a bundle of hollow fiber membranes is arranged for cleaning and filtering the blood. The end cap comprises for example an inlet or outlet, respectively, for a liquid, arranged axially in the center of the end cap. A two-start thread fitting a standard blood-line connector is provided round the inlet or outlet, as the case may be.

For assembling the diffusion and/or filtration devices, the end caps are plugged on the openings of the housing, for example by means of a circular key and slot joint, which surrounds the opening of the housing or of the tubular section, respectively. Generally, the key of the key and slot joint is integrated in the housing and engages the slot, which is integrated in the respective end cap. Subsequently, the housing and the respective end cap are inseparably connected by welding the end cap to the housing, in order to seal the diffusion and/or filtration device. For welding the end cap, a welding method using ultrasound (ultrasonic welding) is generally applied, which allows to connect both elements. However, mirror welding, high frequency welding, laser welding and spin welding can also be applied. Afterwards, leak tightness of the device is tested by applying pressurized air to the device.

However, even in the case the end cap is just plugged on the housing, it might be possible that the device exhibits certain tightness and thus, passes the leak test. Consequently, devices could pass the test without being welded properly. Thus, according to the state of the art, it is not possible to reliably differentiate between devices whose end caps are properly welded and those devices whose end caps are just plugged on.

Thus, there is a need for providing a respective device configuration which ensures an identification of devices whose respective end caps are not welded or not welded properly. In the following, devices whose respective end caps are not welded or not welded properly are also called "unwelded devices" or "improperly welded devices".

Several proposals have been made in the prior art:

U.S. Pat. No. 4,817,815 describes a sealed container with a cylindrical jacket which is closed at opposite ends by closure pieces welded to the jacket. One closure piece forms a lid having an outlet opening pre-sealed by a tear-off tab. The lid includes a skirt projecting into the jacket, and a gas vent opening which is open during the installation of the closure pieces to vent displaced gas, and is thereafter closed by securing an end of the tear-off tab thereover, or by deforming the lid material, or by placing a drop of hardenable plastic in the vent opening.

DE 1 722 672 discloses a container for aerogenous substances. The container is closed by a cap and comprises a thin channel or notch on the contacting surface between the cap and the container for allowing gas to pass from the inside to the outside of the container.

DE 38 23 870 C2 teaches a pipe connection, in particular for the refrigerant circuit of air-conditioning systems, having a pipe which is plugged into a receiving means and bears, by means of an annular collar, on the shoulder of the receiving means. The receiving means exhibits a cutout which is covered by the annular collar and into which there is inserted an O-ring which is compressed in the radial direction. In order to be able to establish the absence of the O-ring, the annular collar and/or the shoulder are provided with notches which span the abutting region.

EP 1 323 462 discloses a filter device comprising a plurality of radial channels perpendicular to a first plurality of rounded ridges on an upper surface of an annular anchor. The radial channels allow air to escape when a potting material is applied to the filter device.

EP 0 297 410 A2 discloses a heat exchanger comprising an independent space defined by an inner wall of a heat exchanger housing and one partition inside the housing. The space extends the entire circumference of the housing, but does not provide a fluid communication with a first and second fluid chamber of the housing. The heat exchanger further comprises a vent in the housing for communicating the space to the ambient atmosphere.

SUMMARY

The present disclosure provides an end cap for a pressure vessel, the pressure vessel having the end cap and a housing, wherein the end cap comprises at least one connecting part for connecting the end cap to the housing by engaging a counterpart of the housing, wherein the at least one connecting part comprises a number of recesses, the number of recesses being formed on surfaces of the at least one connecting part facing the counterpart of the housing as to provide at least one fluid passage between an inside and an outside of the pressure vessel, when the end cap is plugged on said housing.

According to one embodiment an end cap for a pressure vessel comprising a connecting joint for connecting the end cap to a housing is provided, wherein at least a part of said connecting joint is designed to engage a counterpart of the housing, thus defining a contacting surface between said connecting joint and said counterpart of said housing, wherein the at least one part of said connecting joint comprises at least one side wall facing towards the interior of the end cap, said inner side wall, and at least one side wall opposite to the at least one said inner side wall facing towards the exterior of the end cap, said outer side wall, each side wall defining a surface, wherein each side wall engaging the counterpart of a housing comprises a given number of recesses, the recesses being distributed between said surfaces of said side walls.

According to one embodiment, the pressure vessel is a diffusion and/or filtration device. However, the pressure vessel can also be any container or tank comprising a housing and a hollow space inside of the housing.

According to another embodiment, the at least one connecting part of the end cap is a slot of a key and slot joint, wherein the at least one slot comprises the number of recesses. The corresponding counterpart of the housing corresponds then to the key of the key and slot joint. The key is generally integrated in the housing.

In one embodiment, the end cap comprises two annular leg portions on the cap, an inner and an outer leg portion, forming an annular slot in between, wherein the two leg portions define a contacting surface between the end cap and the counterpart of the housing. By means of the key and slot joint the end cap can be plugged on the housing of the pressure vessel so as to close an opening of the housing. For example, the slot can be engaged by an annular single-legged key counterpart of the housing, so that the slot formed by the two leg portions of the end cap is closed by the key. Specifically, the two side walls of the annular leg portions of the end cap facing the slot, i.e. the outer side wall of the inner leg and the inner side wall of the outer leg, overlap with both side walls of the annular leg portion of the housing. In such an embodiment, the side walls of the annular leg portions of the end cap facing the counterpart of the housing comprise recesses as to provide at least one fluid passage which extends from the inside of the end cap to the outside of the end cap, in case the end cap is plugged on the housing. Thus, artificial leaks, i.e. volitional leaks, defined by the fluid passages are generated and a fluid is able to flow through the fluid passages from the inside to the outside or vice versa.

In case the end cap is plugged on said housing, the key of the key and slot joint which is integrated in the housing engages the slot of the end cap and substantially seals the slot. However, the recesses locally enlarge a cross-section of the slot and therefore are not sealed by the key. In fact, the walls of the fluid passage are formed by both, walls of the recesses and a surface of the key, in case the end cap is plugged on the housing.

According to one embodiment, at least one first recess and at least one second recess of the number of recesses are arranged oppositely to each other with respect to the at least one connecting part, thus forming at least one fluid passage between an inside and an outside of the end cap, in case the end cap is plugged on said housing.

Thus, a first recess is arranged at a first side wall of the slot formed by the two annular leg portions of the end cap, for example the outer side of the inner leg portion, and the second recess is arranged at an opposing second side wall of the slot, the inner side of the outer leg portion, wherein the first and the second recesses are arranged in a common plane, the plane representing a cross section of the slot. Thus, when the key of the housing engages the slot, the fluid can pass through one recess from the inside of the end cap or the whole device, respectively, into the slot and from the slot to the outside by means of the second recess or vice versa.

It is also possible, that both recesses are directly connected to each other, so that the fluid can directly flow from one recess to the other. In this case, both recesses are configured to form one common recess on a surface of the slot for directly guiding the fluid from the inside to the outside of the housing or the end cap, respectively.

According to another embodiment, at least one first recess and at least one second recess of the number of recesses are arranged with an offset to each other with respect to the at least one part, thus forming at least one fluid passage between an inside and an outside of the end cap, in case the end cap is plugged on said housing.

This means, that the first recess is arranged at a first side wall of the slot, for example the outer side of the inner leg portion, and the second recess is arranged at an opposing second side wall of the slot, the inner side of the outer leg portion. However, the first and the second recess are not arranged in a common plane but in parallel planes being spaced apart from each other, each plane representing one cross section of the slot.

Thus, when the key of the housing engages the slot, the fluid can pass through one recess into the slot and from the slot into the other recess according to the description given above. However, due to the offset, the fluid also has to pass partly along the extension of the slot to overcome the distance caused by the offset.

Further, it is possible to form an additional recess running partly along the extension of the slot linking the first and the second recess to improve the flow of the fluid by locally increasing the cross-section of the slot.

By way of example only, the offset of the recesses is about 5 mm. The provision of such an offset can reduce the effect of a local attenuation or thinning of the end cap and therefore, ensures rigidity of the end cap.

According to one possible embodiment, at least a part of the number of recesses is extending in an axial direction of the end cap.

For example, the axial direction is usually defined by an axis of symmetry or by a direction of extraction, when the end cap is extracted from a casting mold. In both cases, the axial direction is aligned in parallel with a longitudinal axis of the housing or the device, respectively, in case the end cap is plugged on the housing. However, also other alignments of the recesses are possible.

Furthermore, dimensions of the recesses can be sized so as to be sealable by welding the end cap to the housing. On the one hand, the recesses have to form a fluid passage which is large enough to create an intended leak, i.e. an volitional leak allowing a significant fluid flow to pass through the fluid passage in order to be detected in a leak test in case the end cap is not properly welded on the housing, particularly in case the end cap is just plugged on the housing. This means that a sufficient amount of fluid must be able to pass through the fluid passage for detecting such a leak. On the other hand, the recesses have to be sized small enough to be sealed during a step of welding the end cap to the housing. If they are sized too large, the fluid passage can not be sealed properly although the welding step has been properly performed. So in this case, the recesses are not appropriate to indicate an improperly or even unwelded device.

For way of example only, the recesses can have a length of about 1 mm along the extension of the slot and a width between 0.03 mm to 0.1 mm in a direction being perpendicular to the slot, for example in a radial direction of a circular end cap. It will be understood, that any other suitable values are possible as well.

It will be understood that the embodiment of the part of the end cap comprising two annular leg portions and the corresponding counterpart of the housing being a key and a slot of a key and slot joint is used in the previous description by way of example only. However, the part and the corresponding counterpart can also be formed by other suitable connection means for providing a positive connection between the end cap and the housing.

According to another embodiment, the end cap described above comprising two annular leg portions can engage a counterpart of the housing comprising two annular leg portions analogue to the leg portions of the connecting joint of the end cap.

In one embodiment, the outer leg portion of the housing forms the key of the slot and key joint, wherein the side walls of the annular legs facing the inner of the slot on the end cap overlap the inner and outer side wall of the outer leg of the housing and the inner side wall of the inner leg of the end cap overlaps the outer side wall of the inner leg of the housing.

In another embodiment, the inner leg portion of the housing forms the key of the slot and key joint, wherein the side walls of the annular legs facing the slot on the end cap overlap the inner and outer side wall of the inner leg of the housing and the outer side wall of the outer leg of the end cap overlaps the inner side wall of the outer leg of the housing.

In a further embodiment, both inner and outer side walls of the two annular portions of the connecting joint of the end cap are overlapped by three annular leg portions of the counterpart of the housing. Specifically, the inner side wall of the outer leg of the housing overlaps the outer side wall of the outer leg of the end cap, the inner side wall and the outer side wall of the middle leg of the housing overlap the side walls of the two leg portions facing the slot on the end cap, respectively, and the outer side wall of the inner leg of the housing overlaps the inner side wall of the inner leg of the end cap. In the above-mentioned embodiments, every side wall of the two annular leg portions of the end cap facing one side wall of the annular leg portions of the counterpart of the housing comprises recesses as to provide at least one fluid passage which extends from the inside of the pressure vessel to the outside of the pressure vessel, in case the end cap is plugged on the housing.

In another embodiment, the at least one connecting part of the connecting joint of the end cap is designed to overlap a counterpart of the housing or to be overlapped by the same. In one embodiment, the at least one connecting part of the connecting joint is an annular leg portion, wherein the leg portion extends from the connecting joint to the exterior of the end cap and is perpendicular to the axial direction of the end cap, thus defining a front and a rear side wall. The axial direction is usually defined by an axis of symmetry or by a direction of extraction, when the end cap is extracted from a casting mold. In both cases, the axial direction is aligned in parallel with a longitudinal axis of the housing or the device, respectively, in case the end cap is plugged on the housing. The overlapping surface is defined by the length of the leg portion and comprises at least one recess as to provide a fluid passage between the inner side of the cap and the outer side, in case the cap is plugged on the housing.

In another embodiment, the leg portion of the end cap has an angle α of 270°>α>90° to the axial direction, defining a front side wall and a rear side wall. Here, the overlapping surface is defined by the length of the leg portion and bears at least one recess as to provide a fluid passage between an inside and an outside of the respective pressure vessel, in case the end cap is plugged on a corresponding housing. In one embodiment of invention, the inner side wall overlaps the counterpart of the housing, in another embodiment the inner side wall is overlapped by said counterpart.

According to one further aspect, a housing for a pressure vessel is provided, having at least one counterpart for connecting an end cap to the housing by engaging a part of the end cap, wherein the at least one counterpart comprises a number of recesses. The number of recesses being arranged so as to form at least one fluid passage between an inside and an outside of the housing, in case said end cap is plugged on said housing.

According to another embodiment, the at least one counterpart is a key of a key and slot joint, wherein the at least one key comprises the number of recesses.

This means, that the housing comprises a plug which forms a counterpart, for example a key of a key and slot joint. By means of the respective part and counterpart, for example the key and slot joint, the end cap can be plugged on the housing of the device so as to close an opening of the housing. For example, the key can be formed as a key completely surrounding the opening of the housing. In case of a circular opening the key can be formed as a circular key. The recesses of the key are arranged to form fluid passages which extend from the inside of the housing to the outside of the housing while the end cap is plugged on the housing. Thus, volitional leaks defined by the fluid passages are generated and a fluid is able to flow through the fluid passages from the inside to the outside or vice versa.

The recesses are formed as notches in the key and are locally reducing a cross-section of the key. When said end cap is plugged on the housing, the key of the key and slot joint engages the slot of the end cap and substantially seals the slot. However, by means of the locally reduced cross section, the recesses form the respective fluid passage. In fact, the side walls of the fluid passage are formed by both, the walls of the recesses in the key and the surface of the slot.

According to another embodiment, at least one first recess and at least one second recess of the number of recesses are arranged oppositely to each other with respect to the at least one counterpart, thus forming at least one fluid passage between an inside and an outside of the housing, in case the end cap is plugged on said housing.

Thus, a first recess is arranged at a first side wall of the at least one counterpart, for example the key, and the second recess is arranged at an opposing second side wall of the key, wherein the first and the second recesses are arranged in a common plane and the plane represents a cross section of the key.

Thus, when the key of the housing engages the slot, the fluid can pass through one recess from the inside of the housing into the slot and from the slot to the outside by means of the second recess or vice versa.

It is also possible, that both recesses are directly linked with each other, so that the fluid can directly flow from one recess to the other, without passing the slot itself. In this case, both recesses are forming one common recess extending on a surface of the key for directly guiding the fluid from the inside to the outside of the housing.

According to another aspect, at least one first recess and at least one second recess of the number of recesses are arranged with an offset to each other with respect to the at least one counterpart, thus forming at least one fluid passage between an inside and an outside of the housing, in case the end cap is plugged on said housing.

This means, that the first recess is arranged at a first side wall of the key and the second recess is arranged at an opposing second side wall of the key. However, the first and the second recesses are not arranged in a common plane but in parallel planes being spaced apart from each other, each plane representing one cross section of the key.

Thus, when the key of the housing engages the slot, the fluid can pass through one recess into the slot and from the slot into the other recess according to the present description. Due to the offset, the fluid also has to pass partly along the extension of the slot to overcome the distance caused by the offset.

Further, it is possible to form an additional recess running partly along the extension of the key linking the first and the second recess to improve the flow of the fluid by locally reducing a size of the key.

By way of example only, the offset of the recesses is about 5 mm. The provision of such an offset of the recesses can reduce the effect of a local attenuation or local thinning of the key and the housing and therefore, ensures rigidity of the key.

According to another embodiment, at least a part of the number of recesses is extending in an axial direction of the housing.

The housing usually comprises a longitudinal axis forming the axial direction. Thus, also the extension of the recesses is basically parallel to said direction. However, also other alignments of the recesses are possible.

Furthermore, dimensions of the recesses are to be sized so as to be sealable by welding the end cap to the housing. On the one hand, the recesses have to form a fluid passage which is large enough to create a volitional leak allowing a significant fluid flow to pass through the fluid passage in order to be detected in a leak test in case the end cap is not properly welded on the housing, particularly in case the end cap is just plugged on the housing. This means, that a sufficient amount of the fluid must be able to pass through the fluid passage for detecting such a leak. On the other hand, the recesses have to be sized small enough to be sealed during a step of welding the end cap to the housing. If they are sized too large, the fluid is not sealed properly although the welding step has been properly performed and the device exhibits a leak even after welding.

For way of example only, the recesses can have a length of about 1 mm along the extension of the key and a width between 0.03 mm to 0.1 mm in a direction being perpendicular to the key, for example in a radial direction of a circular housing. It is to be understood, that any other suitable values are also possible.

According to another aspect, a pressure vessel is provided which comprises a housing and at least one end cap which is configured to close at least one opening of the housing, wherein the at least one end cap can be plugged to said housing by engaging at least one part of the end cap in at least one corresponding counterpart of the housing, and welded, wherein the end cap is formed according to the foregoing description.

This means, that the device comprises a respective end cap having a number of recesses according to the description given above. The housing itself can be formed without any recesses.

According to still another aspect, a pressure vessel is provided which comprises a housing and at least one end cap which is configured to close at least one opening of the housing, wherein the at least one end cap can be plugged on said housing by engaging at least one part of the end cap in at least one corresponding counterpart of the housing and welded, wherein the housing is formed according to the foregoing description within the present disclosure.

This means, that the device comprises a respective housing having a number of recesses according to the present description. The end cap itself can be formed without any recesses.

It will be understood, that it is also possible to provide both, the end cap and the housing with respective recesses according to the present description.

Furthermore, a method is provided for leak testing a respective pressure vessel in case that the at least one end cap is connected to but not necessarily already properly welded on the housing, wherein a test fluid is employed and it is checked whether a fluid flow of the test fluid is passing at a location at which the at least one fluid passage between an inside and an outside of the end cap and/or of the housing of the pressure vessel has been originally formed, wherein a detection of such a fluid flow is interpreted in that the end cap has not yet been properly welded on the housing of the pressure vessel.

Thus, an assembled pressure vessel or device, respectively, can be tested whether there are any leaks. As the fluid passages exhibit volitional leaks, an unwelded or an improperly welded device can be identified by means of the described method. In case the device has already been welded, the fluid passages are sealed by welding the end cap to the housing and consequently, they do not provide any leak.

The leak testing can be improved and accelerated by applying a pressure difference to the device, wherein the pressure difference is set for the test fluid between the inside and the outside of the device, and checking whether a fluid flow of the test fluid is passing at a location at which the at least one fluid passage between an inside and an outside of the end cap and/or of the housing of the device has been originally formed.

The pressure difference being applied for the fluid between the inside and the outside of the device can either be a difference of absolute pressures or a difference of partial pressures of at least one fluid component. This means, that also a concentration difference or a difference of the partial pressure, respectively, within the fluid can be used to cause a fluid flow through the fluid passage. Thus, also a flow of the at least one fluid component can be used for detecting a leak.

Further, a method for checking a connection between at least one first tubular member and at least one second tubular member for leak tightness is provided. The at least one first tubular member is configured to close at least one opening of the at least one second tubular member via at least one part of the first member and at least one corresponding counterpart of the second member, and to be plugged and then welded on said at least one second tubular member via the at least one part of the first member and counterpart of the second member. A number of recesses at the at least one part of the first member and/or counterpart of the second member is provided, wherein the number of recesses is arranged so as to form at least one fluid passage between an inside and an outside of the connected members in case that the at least one first tubular member is plugged but not yet properly welded on the at least one second tubular member. The at least one fluid passage serves as an indication of an improperly welding when the connected members are submitted to an appropriate leak testing.

According to one embodiment, the members comprise thermoplastic material, such as polycarbonate (PC). According to another embodiment, the members comprise metal being weldable for welding the members. Thus, a method for welding has to be selected and adapted according to the respective material of the elements.

According to one embodiment, the at least one first member is an end cap and the at least one second member is a housing of a diffusion and/or filtration device and the at least one part and the at least one corresponding counterpart form a key and slot joint, so that a method is provided for checking a connection between the at least one end cap and the housing of the diffusion and/or filtration device for leak tightness. The at least one end cap is configured to close at least one opening of the housing via the at least one key and slot joint and to be plugged and then welded on said housing via the at least one key and slot joint. A number of recesses at the at least one key and slot joint is provided, wherein the number of recesses is arranged so as to form at least one fluid passage between an inside and an outside of the device in case that the end cap is plugged but not yet properly welded on the housing. The at least one fluid passage serves as an indication of an improperly welding when the device is submitted to an appropriate leak testing.

For testing the device, air might be used for leak testing. However, even other fluids might be used, such as gases or liquids (e.g. water). In case a gas is used for leak testing, a leak can be detected by means of a respective gas detector. Moreover, an appropriate mass spectrometer can be used.

Further features and embodiments will become apparent from the description and the accompanying drawings.

It will be understood that the features mentioned above and those described hereinafter can be used not only in the combination specified but also in other combinations or on their own, without departing from the scope of the present disclosure.

Various implementations are schematically illustrated in the drawings by means of an embodiment by way of example and are hereinafter explained in detail with reference to the drawings. It is understood that the description is in no way limiting on the scope of the present disclosure and is merely an illustration of a possible embodiment.

DETAILED DESCRIPTION

Figure 1:
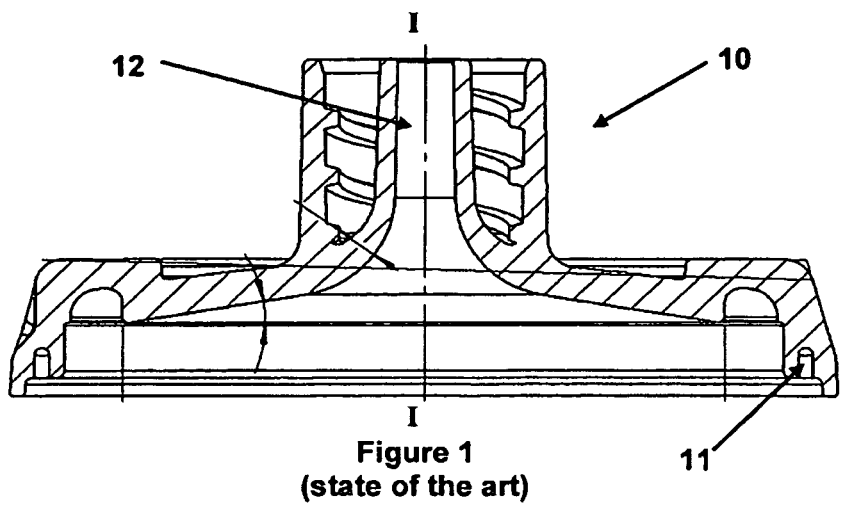
FIG. 1 shows a schematic cross-sectional side view of an end cap according to the state of the art.

FIG. 1 shows an end cap 10 according to the state of the art for diffusion and/or filtration devices. As shown in FIG. 1, the end cap 10 comprises an inlet or outlet 12, respectively, for a liquid, arranged axially (axis I-I) in the center of the end cap 10. A two-start thread fitting a standard bloodline connector is provided round the inlet or outlet, as the case may be.

The end cap 10 is configured to be plugged on an opening of a housing (not shown) for assembly of the respective diffusion and/or filtration device. For this purpose, the end cap 10 comprises a slot 11, which is part of a circular key and slot joint, which surrounds an edge of the end cap 10. Generally, a respective key of the key and slot joint is integrated in the housing (not shown) for engaging the slot 11 integrated in the end cap 10.

However, even if the end cap 10 according to the state of the art is just plugged on a housing, the device can provide certain tightness and thus, passes usual leak tests. So it is not possible to identify devices which are already welded and devices which are just plugged together.

Figure 2:
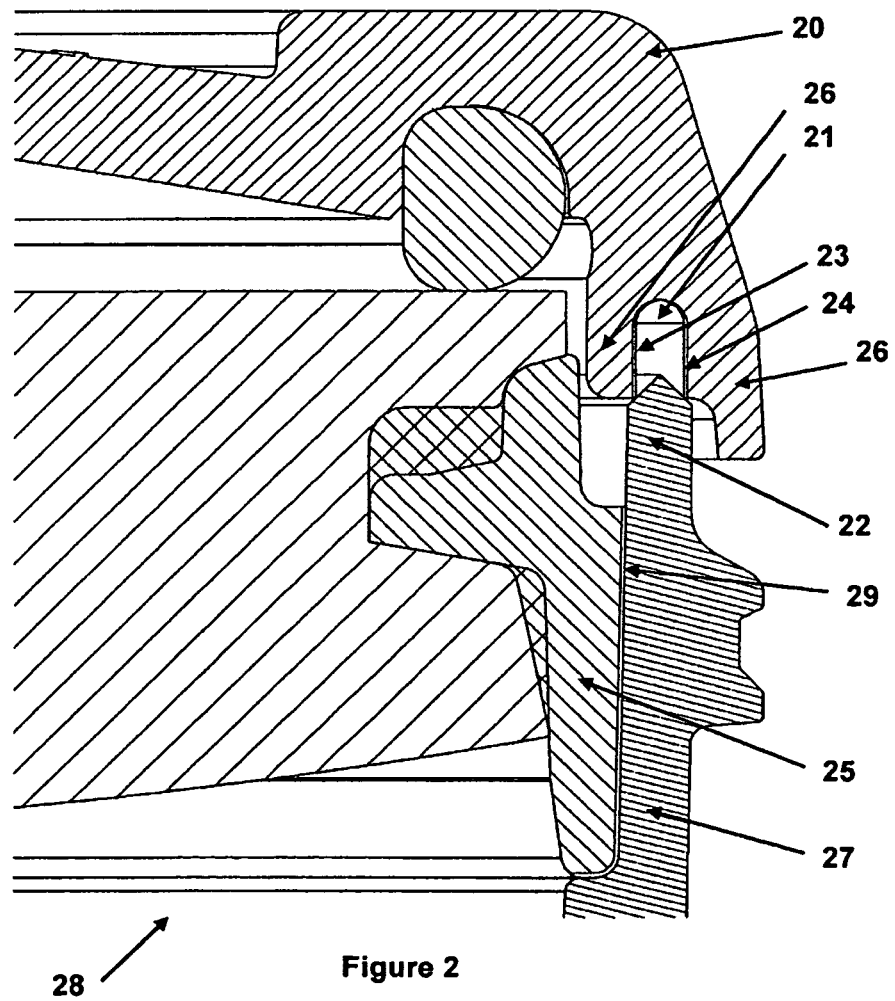
FIG. 2 shows a partially cross-sectional side-view of an embodiment of an diffusion and/or filtration devices comprising an end cap according to the present description.

FIG. 2 shows a side, partially cross-sectional view of an embodiment of an assembled diffusion and/or filtration device 28 according to the present disclosure. The device 28 comprises an end cap 20 according to the present description and a housing 27 which are configured for being connected to each other by means of a key and slot joint. The device 28 further comprises a supporting structure 25 for supporting a bundle of hollow fiber membranes (not shown) inside the housing 27.

The end cap 20 comprises a slot 21 which is part of the key and slot joint and which can be engaged by a key 22 integrally formed at one end of the housing 27. The key 22 represents the second part of the key and slot joint and surrounds an opening of the housing 27. As shown in FIG. 2, the key and slot joint is not engaged yet. When the end cap 20 is plugged on the housing 27 the key 22 enters the slot 21 and the legs 26 are spread outwardly. In order to ensure tightness and rigidity of the device 28, the end cap 20 is to be welded to the housing 27.

In order to identify devices being improperly or even unwelded, volitional leaks are provided in the key and slot joint. According to one embodiment as shown in FIG. 2, the slot 21 comprises a number of recesses 23, 24. A first recess 23 is arranged at an inner side wall and a second recess 24 is arranged at an outer side wall of the slot 21. Thus, the recesses 23, 24 are arranged to form at least one fluid passage between an inside and an outside of the device 28 in case the end cap 20 is plugged on the housing 27 by locally enlarging a cross-section of the slot 21. Further, they are extended in an axial direction of the end cap 20 (as defined in FIG. 1: I-I). Thus, the fluid passage represents the volitional leak and is defined by the recesses 23, 24, a surface of the key 22 and the slot 21.

The recesses 23, 24 are just formed at local spots of the slot. Thus, when the key 22 engages the slot 21, only the proper slot 21 is closed by the key 22. However, the recesses 23, 24 remain open with respect to the inside and the outside of the device 28.

In order to ensure access to the first recess 23 of the slot, also the supporting structure 25 can comprise at least one notch 29 to provide a channel for the fluid to be guided from an internal space inside of the housing 27 towards the first recess 23. As the supporting structure 25 is inserted mechanically into the housing 27, it does not provide a sealing effect preventing the fluid flow towards the first recess 23. Thus, the at least one notch 29 of the supporting structure 25 is provided optionally to improve the fluid flow, but it is not mandatory.

Figure 3:
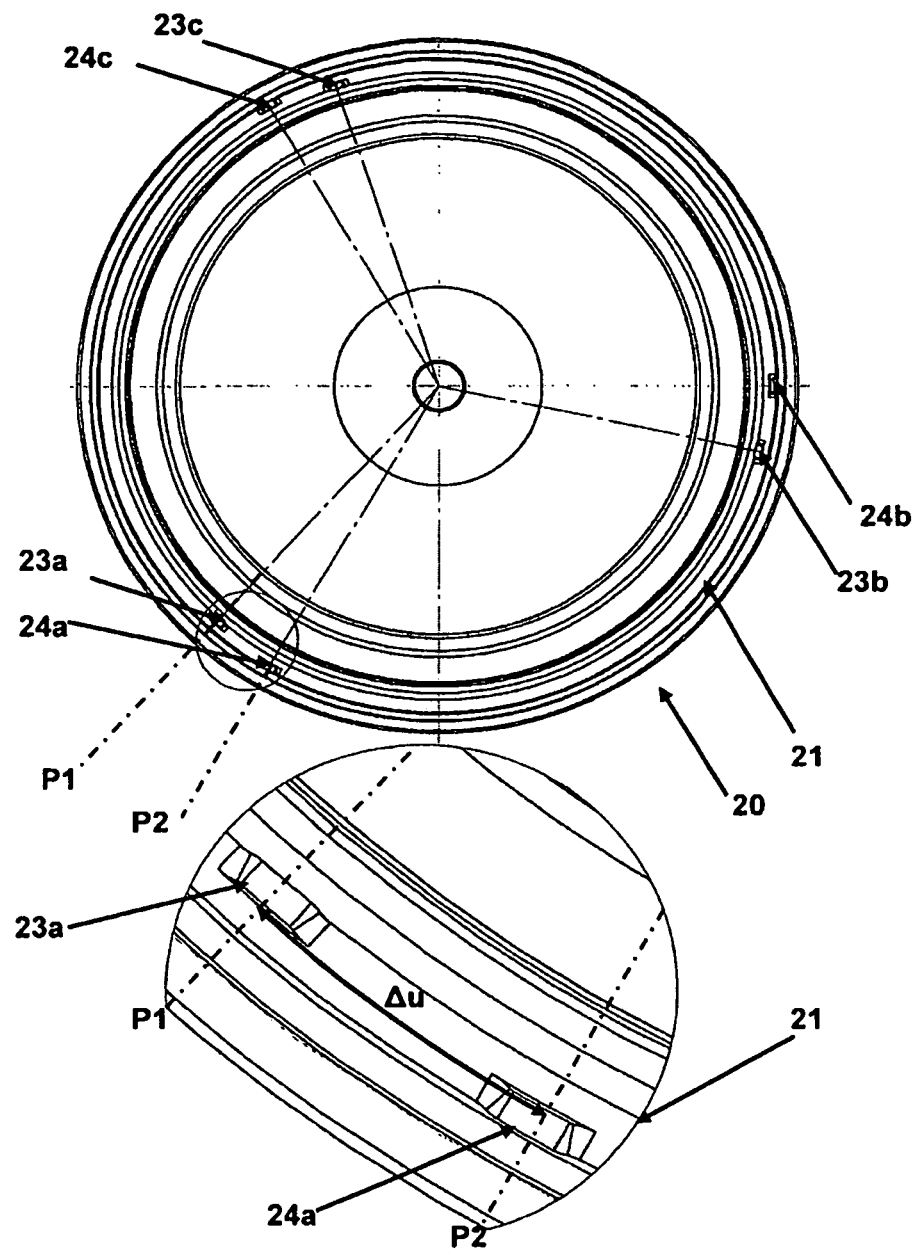
FIG. 3 shows a top view of one embodiment of an end cap according to the present description.

FIG. 3 shows a top view of one embodiment of an end cap 20 according to the present description.

According to the depicted embodiment, three first recesses 23a, b, c and three second recesses 24a, b, c are arranged at the slot 21 of the end cap 20. The first recesses 23a, b, c are arranged with an angular distance of about 120° to each other. The same applies to the second recesses 24a, b, c. Each first recess 23a, b, c and each corresponding second recess 24a, b, c being arranged next to the respective first recess 23a, b, c are arranged with an offset Δu to each other with respect to the at least one slot 21, thus forming at least one fluid passage between an inside and an outside of the end cap 20, in case the end cap is plugged on said housing. According to the embodiment, the end cap 20 comprises three fluid passages. However, any number of fluid passages is possible. On the one hand, a high number of fluid passages might improve a quality test for ensuring that a circular welding was successful, if desired. On the other hand the high number of fluid passages might reduce the rigidity of the end cap 20. Thus, an optimal number has to be defined according to respective requirements.

For way of example only, the first recess 23a is arranged at a first side wall of the slot 21 and the second recess 24a is arranged at an opposing second side wall of the slot 21. However, the first and the second recesses are not arranged in a common radial plane but in planes P1, P2 being spaced apart from each other. Each plane represents one radial cross section of the slot.

Thus, when the key 22 of the housing 27 engages the slot 21, the fluid can also pass from the first recesses 23a, b, c into the slot 21 and from the slot 21 into the second recesses 24a, b, c or vice versa, according to the present description. In case of the offset Δu, the fluid has to pass along the slot 21 to get from one plane P1, P2 to the other and overcome the offset Δu.

For way of example only, the recesses 23a, b, c, 24a, b, c can have a length l of about 1 mm along the extension of the slot (circumferential direction) and a width w between 0.03 mm to 0.1 mm in a direction being perpendicular to the slot, for example in a radial direction of a circular end cap. It will be understood, that also any other suitable values are possible.

Furthermore, it is possible to form an additional recess (not shown) along the slot 21 between both planes P1, P2 to improve the flow of the fluid by locally increasing a depth of the slot 21.

Figure 4:
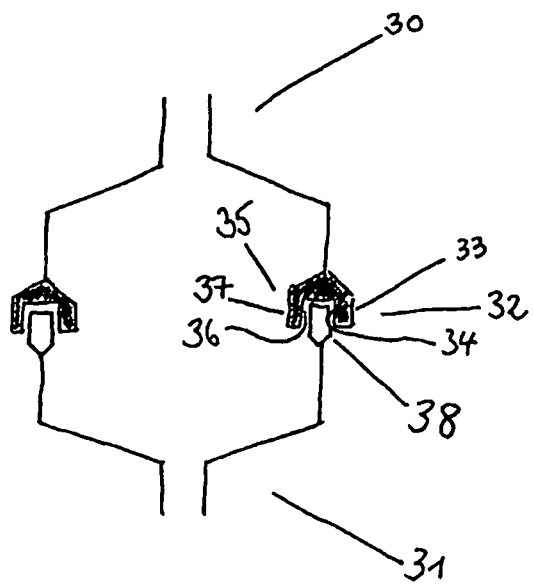
FIG. 4 shows a schematic cross-sectional side view of an embodiment of a pressure vessel according to the present description.

FIG. 4 shows a schematic cross-sectional view of a pressure vessel, wherein the end cap 30 comprises two annular leg portions 32, 35 forming an annular slot in between, wherein the two leg portions define a contacting surface between the end cap 30 and the counterpart on the housing 31. By means of the key and slot joint the end cap can be plugged on the housing of the device so as to close an opening of the housing. Here, the slot is engaged by an annular single-legged key counterpart 38 of the housing, so that the slot formed by the two leg portions of the end cap is closed by the key. Specifically, the two side walls of the annular leg portions of the end cap facing the slot, i.e. the outer side wall 36 of the inner leg 35 and the inner side wall 34 of the outer leg 32, overlap with both side walls of the annular leg portion 38 of the housing. In such an embodiment, the side walls of the annular leg portions of the end cap facing the counterpart of the housing comprise recesses as to provide at least one fluid passage which extends from the inside of the pressure vessel to the outside of the pressure vessel, in case the end cap is plugged on the housing. Thus, artificial leaks, i.e. volitional leaks, defined by the fluid passages are generated and a fluid is able to flow through the fluid passages from the inside to the outside or vice versa.

In case the end cap is plugged on the housing, the key of the key and slot joint which is integrated in the housing engages the slot of the end cap and substantially seals the slot. However, the recesses locally enlarge a cross-section of the slot and therefore are not sealed by the key. In fact, the walls of the fluid passage are formed by both, walls of the recesses and a surface of the key, in case the end cap is plugged on the housing.

Figure 5:
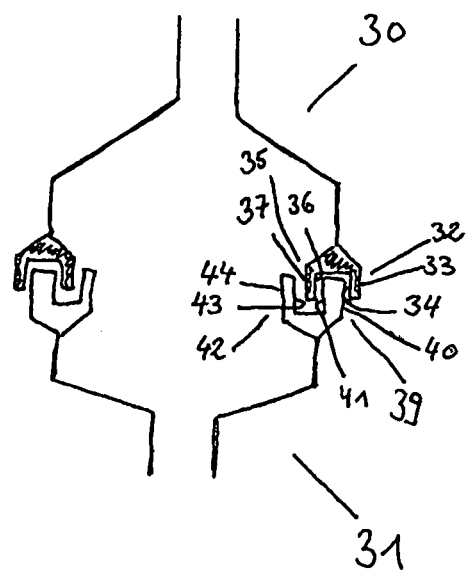
FIG. 5 shows a schematic cross-sectional side view of another embodiment of a pressure vessel according to the present description.

FIG. 5 shows a similar embodiment as described in FIG. 4. Here, the end cap described above is engaged by a counterpart of the housing comprising two annular leg portions 39, 42 analogue to the leg portions of the connecting joint of the end cap. More specifically, the outer leg portion 39 of the housing form the key of the key and slot joint, wherein the side walls 34, 36 of the annular leg portions facing the inner of the slot of the end cap overlap the inner and outer side walls 41, 40 of the outer leg portion 39 of the housing, respectively, and the inner side wall 37 of the inner leg portion 35 of the end cap overlaps the outer side wall 43 of the inner leg portion 42 of the housing.

In such an embodiment, both side walls of the inner leg portion 35 and the inner side wall 34 of the outer leg portion 32 of the end cap comprise recesses as to provide at least one fluid passage between an inside and an outside of the pressure vessel, when the end cap is plugged on said housing.

Figure 6:
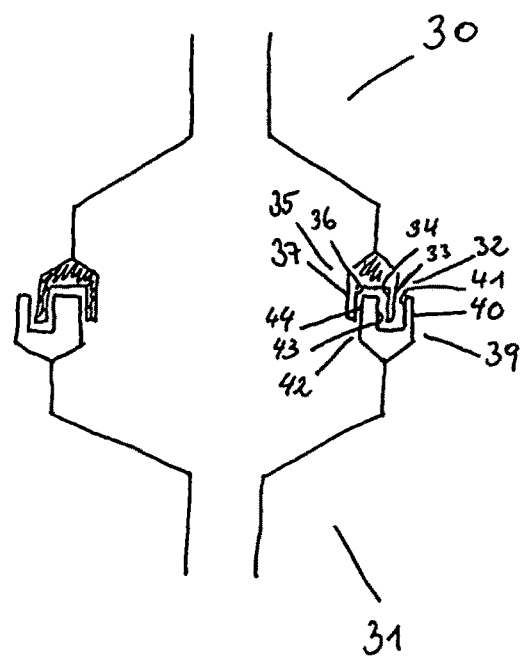
FIG. 6 shows a schematic cross-sectional side view of another embodiment of a pressure vessel according to the present description, wherein the housing comprises two leg portions.

FIG. 6 shows a similar embodiment as displayed in FIG. 5. Here, the inner leg portion 42 of the housing forms the key of the key and slot joint, wherein the side walls of the annular leg portions facing the slot of the end cap overlap the inner and outer side wall 44, 43 of the inner leg portion 42 of the housing and the outer side wall 33 of the outer leg portion 32 of the end cap overlaps the inner side wall 41 of the outer leg portion 39 of the housing.

In such an embodiment, both side walls of the outer leg portion 32 and the outer side wall 36 of the inner leg portion 35 of the end cap comprise recesses as to provide at least one fluid passage between an inside and an outside of the pressure vessel, when the end cap is plugged on said housing.

Figure 7:
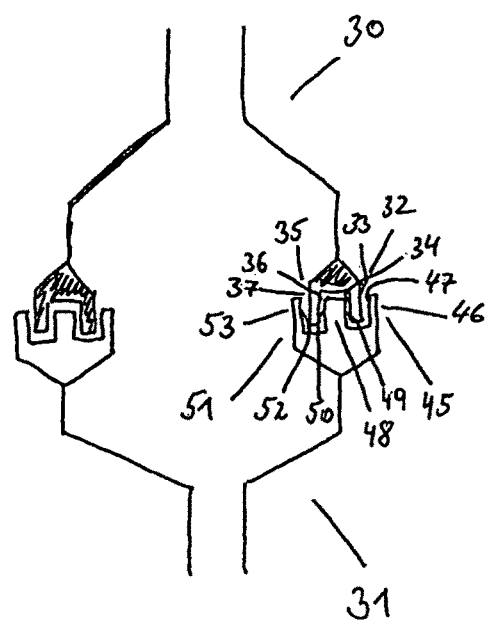
FIG. 7 shows a schematic cross-sectional side view of yet a further embodiment of a pressure vessel according to the present description.

FIG. 7 shows a further embodiment, where the slot on the end cap is engaged by three leg portions 45, 48, 51 of the housing, i.e. both inner and outer side walls of the two annular leg portions 32, 35 of the connecting joint of the end cap are engaged by three annular leg portions of the counterpart of the housing. More specifically, the inner side wall 47 of the outer leg portion 45 of the housing overlaps the outer side wall 33 of the outer leg portion 32 of the end cap, the inner and outer side wall 50, 49 of the middle leg portion 48 of the housing overlaps the side walls 34, 36 of the two leg portions facing the slot on the end cap, and the outer side wall 52 of the inner leg portion 51 of the housing overlaps the inner side wall 37 of the inner leg portion 35 of the end cap.

In the above-mentioned embodiments, every side wall of the two annular leg portions of the end cap engaging one side wall of the annular leg portions of the counterpart of the housing comprises recesses as to provide at least one fluid passage between an inside and an outside of the pressure vessel, when the end cap is plugged on said housing.

Figure 8:
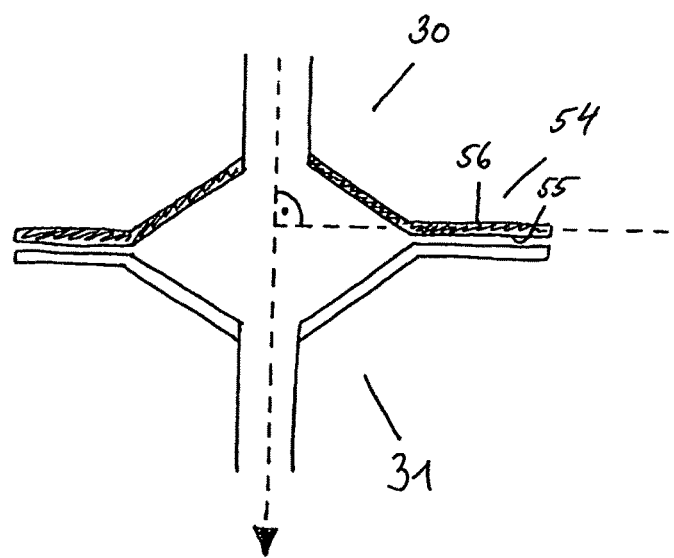
FIG. 8 shows a schematic cross-sectional side view of still another embodiment of a pressure vessel according to the present description.

FIG. 8 shows a schematic cross-sectional view of a further embodiment, where the at least one connecting part of the connecting joint of the end cap is designed to overlap the counterpart of a housing or to be overlapped by the same. Here, the at least one connecting part of the connecting joint is an annular leg portion 54 defining a front side wall 55 and a rear side wall 56, wherein the leg portion extends from the connecting joint to the exterior of the end cap and is perpendicular to the axial direction of the end cap. The axial direction is usually defined by an axis of symmetry or by a direction of extraction, when the end cap is extracted from a casting mold. In both cases, the axial direction is aligned in parallel with a longitudinal axis of the housing or the pressure vessel, respectively, in case the end cap is plugged on the housing. The overlapping surface on the front side wall 55 is defined by the length of the leg portion and comprises at least one recess as to provide a fluid passage between an inside and an outside of the pressure vessel, when the end cap is plugged on said housing.

Figure 9:
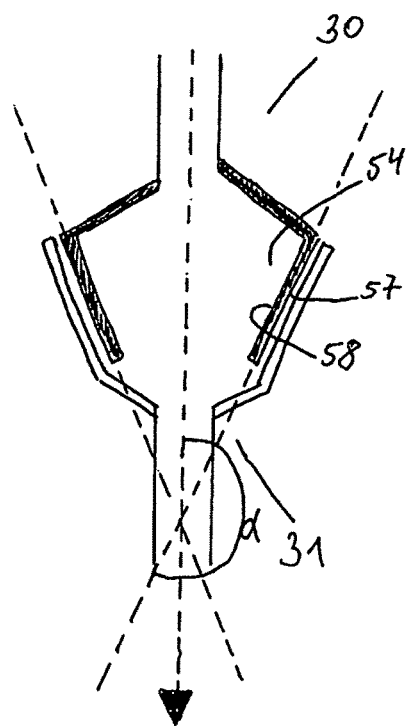
FIG. 9 shows a schematic cross-sectional side view of another embodiment of a pressure vessel according to the present description.

FIG. 9 shows a similar embodiment as described in FIG. 8, wherein the annular leg portion 54 of the end cap has an angle α of 270°>α>90° to the axial direction, defining a outer side wall 57 and an inner side wall 58. Again, the overlapping surface on the outer side wall 57 is defined by the length of the leg portion and comprises at least one recess as to provide a fluid passage between an inside and an outside of the pressure vessel, in case the end cap is plugged on the housing.

In an analogue embodiment, the inner side wall 58 of the annular leg portion 54 overlaps the counterpart of the housing (not shown), wherein the overlapping surface of the end cap provides said recesses.

The invention claimed is:

1. In combination, an end cap and a housing having an open end, the end cap to close the open end of the housing, one of the end cap and housing comprising a slot and the other of the end cap and housing comprising a key, the key and slot together forming a key and slot joint when the end cap and housing are assembled, n first recesses, n an integer, the n first recesses arranged with an angular spacing of about 360°/n to each other around the slot of the end cap, and n second recesses arranged with an angular spacing of about 360°/n to each other around the slot, each second recess being arranged adjacent, but offset perimetrally of the housing and end cap from a respective first recess to provide a respective fluid passage which extends at least partially perimetrally of the housing and end cap between an inside and an outside of the assembled end cap and housing, wherein n is an integer greater than 1.

2. The apparatus of claim 1 wherein each of the first recesses are arranged at a first side wall of the slot and each of the second recesses are arranged at an opposing second side wall of the slot in a radial plane angularly spaced from a radial plane containing the respective first recesses with the portion of the slot between each first recess and a respective second recess spanning the perimetral offset and forming a portion of a respective permanent fluid passage.

3. The apparatus of claim 1 wherein the slot is formed on the end cap and the key is formed on the housing.

* * * * *